H. H. KENNEDY.
FOUR-SEATED VEHICLE.
APPLICATION FILED AUG. 12, 1912.
1,087,540.
Patented Feb. 17, 1914.
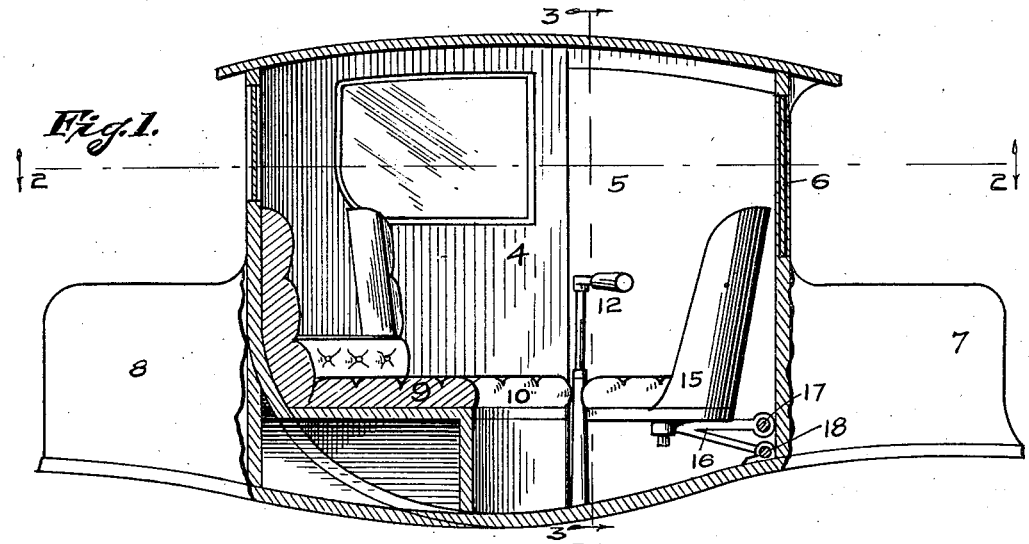
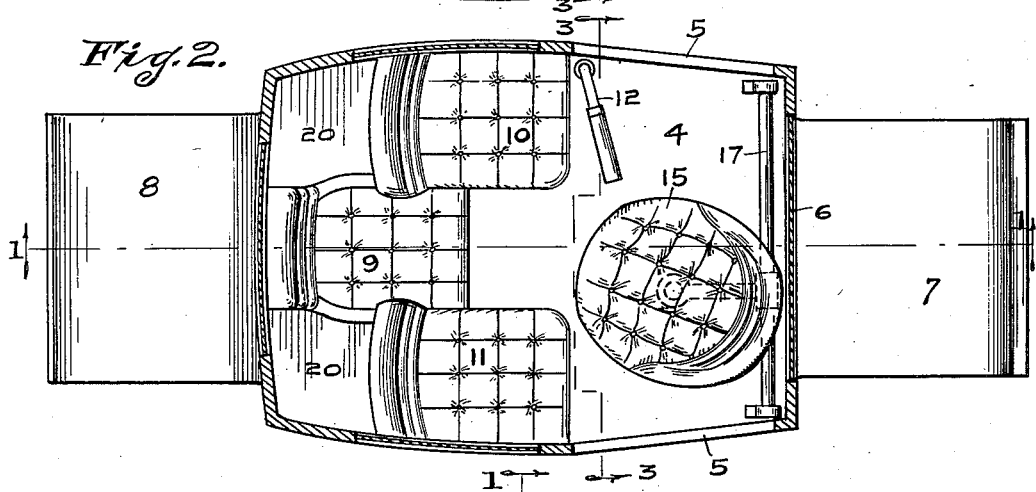
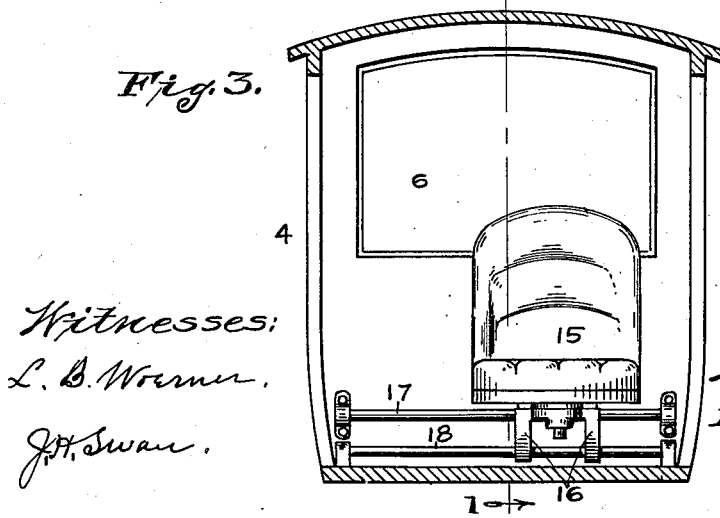
Witnesses:
L. B. Woerner.
J. H. Swan.
Inventor:
Harold H. Kennedy
By Minturn & Woerner,
Attorneys.

UNITED STATES PATENT OFFICE.

HAROLD H. KENNEDY, OF INDIANAPOLIS, INDIANA, ASSIGNOR TO THE WAVERLEY COMPANY, OF INDIANAPOLIS, INDIANA, A CORPORATION OF INDIANA.

FOUR-SEATED VEHICLE.

1,087,540.  Specification of Letters Patent.  Patented Feb. 17, 1914.

Application filed August 12, 1912. Serial No. 714,716.

*To all whom it may concern:*

Be it known that I, HAROLD H. KENNEDY, a citizen of the United States, residing at Indianapolis, in the county of Marion and State of Indiana, have invented certain new and useful Improvements in Four-Seated Vehicles, of which the following is a specification.

The object of this invention is to provide an automobile coach with seats for four passengers, three of whom will face in the direction of travel of the vehicle while the fourth will be comfortably accommodated on a separate seat in a forward corner leaving a wholly unobstructed view for the driver, and to accommodate these four passengers in a short and narrow body which will occupy as little space as possible in the congested street traffic of large cities in a manner to allow free elbow room for all of the passengers without interference with each other.

The object is to provide a vehicle which is particularly adapted for ladies in shopping, calling and personal errands, wherein the hostess, acting as the driver of the vehicle, may retain her place on the rear seat where she will be more sociable and less conspicuous than if required to move to a front seat in advance of such guests as she may have riding with her and still retain a full view ahead through a near front window.

As the shoulders and hips of the passengers require more room than other portions of the body an object of this invention is to so arrange the three rear seats which face to the front that the person on the middle seat will be sufficiently to the rear of the other two that the arms, shoulders and hips of that passenger will be behind the others, and the two passengers next in front will have ample room in front of the passenger on the middle seat. To use a military and naval term they will be seated "in echelon."

Another object of the invention is to movably mount the seat for the front and fourth passenger so it can be readily moved out of the way while the passengers for the rear seats are taking their places or are departing, and then moved to a position where the occupant of this front seat will have ample leg room in front of the rear middle passenger and between the two rear seats in front of said middle one.

The above objects are accomplished by means illustrated in the accompanying drawing, in which—

Figure 1 is a longitudinal vertical section of a vehicle body embodying my invention, taken on the dotted lines 1—1 of Figs. 2 and 3. Fig. 2 is a horizontal section on the line 2—2 of Fig. 1 looking in a downward direction, and Fig. 3 is a vertical cross section on the lines 3—3 of Figs. 1 and 2.

Like characters of reference indicate like parts throughout the several views of the drawing.

4 is the body of a closed vehicle having side doors 5 and a front window 6.

7 is a front battery or motor box and 8 a box for a like purpose at the rear of the body, in the usual manner.

The body may be of any usual and suitable material, of any approved design and will generally have side and rear windows, as shown.

9 is a seat facing toward the front of the vehicle with its back against the rear wall of the body 4, and located midway of the sides of said body and is designed to comfortably seat a single passenger. Two additional seats 10 and 11 also both facing toward the front of the vehicle are located, one on each side of the middle seat 9, against the side walls of the body 4 but sufficiently in advance of the seat 9 to permit ample space at the rear of said seats 10 and 11 for the shoulders, elbows and hips of any passenger occupying the seat 9. The shoulders, elbows and hips of passengers occupying said advanced seats 10 and 11 will come in advance of those of the passenger occupying seat 9 and far enough in front of the body of the latter to afford free and unobstructed shoulder and elbow movement to the passengers in said seats 10 and 11, and the separation of the passengers on seats 10 and 11 will be equal to the width of the seat 9 and such as to prevent all interference between the occupants of said seats 10 and 11.

12 is the steering lever by which the machine is guided and is preferably located in front of seat 10 near the adjacent wall of the body, as shown, and by the arrangement and separation of seats 9 and 11 the driver of the car occupying seat 10, never comes in contact with the elbows of a neighbor and will not be diverted from guiding the car by fear of discommoding a guest, and the same freedom is enjoyed by the guests in their own movements by the knowledge that they are not likely in any way to disturb the hostess or host who is driving the machine.

15 is the fourth seat which is swivelly mounted on a bracket 16 secured on a pair of parallel bars 17 and 18. The bars 17 and 18 are supported by the body 4 near the front lower corner of the body and extend transversely of the latter, as shown in Figs. 2 and 3. The bracket 16 has eyes which slidingly engage the bars 17 and 18 to permit the bracket 16 to be moved transversely of the body to get the seat out of the way of the ingress and egress of the passengers. After the first three passengers in the rear seats are seated, the fourth passenger can draw the bracket 16 and seat 15 toward the right hand door, which is generally used for entrance and exit, before entering, or he can enter first and while standing move the seat to the position shown in the drawing, and either before or after becoming seated can turn the seat 15 on its swivel to the most convenient or any desired position, the preferred position being as shown in Fig. 2 where the feet and legs of the occupant of the seat 15 may occupy part of the space between that seat and the seat 9. In this position, as shown in Figs. 2 and 3, the occupant of the front fourth seat is at one side of the driver in seat 10, which will permit unobstructed view to the latter through the front window 6, and the arrangement of seats is such that the seat 10 for the driver is no farther removed from the window 6 than ordinarily occurs in vehicles of this class, which is important for permitting a correct outlook in driving the car. The space in the rear corners, back of seats 10 and 11 and on each side of seat 9, will preferably have doors 20 to allow access to the spaces below, which extend under all three of the rear seats, affording considerable storage room, and the space above the door 20 may also be utilized for carrying purposes, the above arrangement of seats making this carrying room more than ordinarily available, which is an advantage in a social and family vehicle for which this is intended.

While I have here shown the best form of my invention now known to me, it is obvious that the details may be changed in many ways such as placing the three seats in a curve or the middle seat in advance of the other two without departing from the spirit of the invention. and I therefore do not desire to be limited to the exact construction here disclosed, but

What I claim as new and do wish to secure by Letters Patent of the United States, is—

A closed automobile body provided with a steering mechanism located at one side thereof, three seats arranged to face in substantially the same front direction immediately rearward of said steering mechanism and with the middle seat abruptly off-set rearwardly of the line of the front edges of the adjoining seats for approximately half of the depth of the seat, a bracket-support secured to the body in front of said three seats against the inner wall of the front end of the body, seat-supporting brackets mounted on said bracket-support and adjustable transversely of the body on said bracket-support, and a fourth seat swivelly mounted on said bracket.

In witness whereof, I have hereunto set my hand and seal at Indianapolis, Indiana, this, 19th day of July, A. D. one thousand nine hundred and twelve.

HAROLD H. KENNEDY. [L. S.]

Witnesses:
J. A. MINTURN,
F. W. WOERNER.